US010634260B2

(12) United States Patent
Said

(10) Patent No.: US 10,634,260 B2
(45) Date of Patent: Apr. 28, 2020

(54) RUPTURE DISC WITH UPPER LIP

(71) Applicant: S.P.M FLOW CONTROL, INC., Fort Worth, TX (US)

(72) Inventor: Nuder Said, Fort Worth, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 0 days.

(21) Appl. No.: 15/967,331

(22) Filed: Apr. 30, 2018

(65) Prior Publication Data

US 2018/0313455 A1 Nov. 1, 2018

Related U.S. Application Data

(60) Provisional application No. 62/492,274, filed on Apr. 30, 2017.

(51) Int. Cl.
| | |
|---|---|
| *F16K 17/40* | (2006.01) |
| *F16K 17/16* | (2006.01) |
| *E21B 43/26* | (2006.01) |
| *E21B 34/02* | (2006.01) |

(52) U.S. Cl.
CPC .............. *F16K 17/16* (2013.01); *E21B 34/02* (2013.01); *E21B 43/26* (2013.01); *F16K 17/1606* (2013.01)

(58) Field of Classification Search
CPC ........... F16K 17/16; E21B 34/02; E21B 43/26
USPC ......... 137/68.19, 68.21, 68.23, 68.25, 68.28; 220/89.1, 89.2
See application file for complete search history.

(56) References Cited

U.S. PATENT DOCUMENTS

| | | | | |
|---|---|---|---|---|
| 571,476 | A * | 11/1896 | Hayden | F16K 17/162 220/89.2 |
| 2,370,870 | A * | 3/1945 | McKeague | F16P 7/00 137/68.11 |
| 2,553,267 | A * | 5/1951 | Nedoh | F16K 17/162 137/68.21 |
| 2,608,201 | A * | 8/1952 | Henry | F16K 17/16 137/590 |

(Continued)

FOREIGN PATENT DOCUMENTS

| | | |
|---|---|---|
| CA | 2355608 A1 | 2/2003 |
| WO | 00021800 A1 | 4/2000 |

OTHER PUBLICATIONS

Young, "Written Opinion", International Patent Application No. PCT/US18/30268, dated Jul. 20, 2018, 7 pages.

(Continued)

*Primary Examiner* — Minh Q Le
(74) *Attorney, Agent, or Firm* — Wei Wei Jeang; Grable Martin Fulton PLLC

(57) ABSTRACT

A pressure relief valve assembly includes a rupture disc that is shaped to only be inserted into a particular rupture disc cavity in the correct way. The rupture disc includes a cylindrical rupture disc stem and a radially protruding upper lip. A relief valve body in the pressure relief assembly includes an internal radial shoulder at the entrance of the rupture disc that is narrower than the protruding upper lip of the rupture disc but that is wider than the rupture disc stem. The shoulder allows only the rupture disc stem to be inserted into the rupture disc cavity, not the protruding upper lip. Optionally, the relief valve body is marked with some indicia to indicating the direction of inserting the rupture disc stem and/or a shrapnel catcher for trapping shrapnel of the rupture disc upon rupturing.

20 Claims, 10 Drawing Sheets

(56) References Cited

U.S. PATENT DOCUMENTS

| | | | | |
|---|---|---|---|---|
| 3,794,211 | A * | 2/1974 | Loomba | F17C 13/06 220/303 |
| 4,146,047 | A * | 3/1979 | Wood | B01J 3/002 137/68.26 |
| 4,590,957 | A * | 5/1986 | McFarlane | F16K 17/16 137/68.21 |
| 5,673,934 | A * | 10/1997 | Saccone | B60R 21/264 222/3 |
| 5,711,547 | A * | 1/1998 | Blumenthal | B60R 21/264 222/5 |
| 6,230,733 | B1 | 5/2001 | Strelow et al. | |
| 6,241,473 | B1 * | 6/2001 | Soule | B64C 11/00 137/68.23 |
| 6,691,733 | B1 * | 2/2004 | Morris | F16L 41/16 137/317 |
| 7,350,535 | B2 * | 4/2008 | Liepold | A61M 39/10 137/553 |
| 10,145,482 | B2 * | 12/2018 | Travis | F16K 17/403 |
| 2005/0150547 | A1 * | 7/2005 | Ballenger | F02C 9/263 137/68.19 |
| 2006/0196539 | A1 | 9/2006 | Raska et al. | |
| 2008/0178938 | A1 * | 7/2008 | Stokes | E21B 34/063 137/68.23 |
| 2010/0282330 | A1 * | 11/2010 | Luther | A43B 1/0027 137/68.11 |
| 2013/0037125 | A1 * | 2/2013 | Drake | F04B 49/22 137/68.23 |
| 2013/0126152 | A1 * | 5/2013 | Banks | E21B 43/26 166/53 |
| 2017/0067570 | A1 | 3/2017 | Said | |

OTHER PUBLICATIONS

Young, "International Search Report", International Patent Application No. PCT/US18/30268, dated Jul. 20, 2018, 1 page.

* cited by examiner

RUPTURE DISC WITH UPPER LIP

CROSS-REFERENCE TO RELATED APPLICATIONS

This application claims the benefit of U.S. Patent Provisional Ser. No. 62/492,274 filed on Apr. 30, 2017 and entitled "RUPTURE DISC WITH UPPER LIP," which is hereby incorporated by reference in its entirety for all intents and purposes.

BACKGROUND

A pressure relief valve assembly may include a rupture disc that ruptures when a pressure differential across the pressure relief valve assembly reaches or exceeds a predetermined pressure differential. A rupture disc is a common used safety tool used to alert individuals when high-pressure industrial equipment is malfunctioning. The rupturing of the rupture disc permits fluid to flow through the pressure relief valve assembly, reducing or relieving fluid pressure upstream of the pressure relief valve assembly. After the rupture disc of a pressure relief valve assembly ruptures, the entire pressure relief valve assembly must be replaced, increasing costs associated with pressure relief efforts. Also, after the rupture disc has ruptured, in some cases shrapnel from the rupture disc will not flow out of the pressure relief valve assembly, creating an unwanted pressure spike. The quantity of parts necessary to assemble the pressure relief valve assembly, as well as the amount of time necessary for assembly, may also increase costs associated with pressure relief efforts.

SUMMARY

The disclosed examples are described in detail below with reference to the accompanying drawing figures listed below. The below Summary is provided to illustrate some examples disclosed herein. It is not meant, however, to limit all examples to any particular configuration or sequence of operations.

A first aspect includes a pressure relief valve assembly having a relief valve body having an upper head and a base. One or more internal cavities are formed coaxially along a center axis within the relief valve body, and the internal one or more cavities include at least a rupture disc cavity. The relief valve body further includes an annular shoulder that radially protrudes inward toward the center axis within the rupture disc cavity. The pressure relief valve assembly also includes: a rupture disc having a rupture disc stem with a first diameter and a rupture disc lip with a second diameter that is larger than the first diameter. The relief valve body forms a rupture disc cavity with a third diameter that is smaller than the second diameter of rupture disc lip and larger than the first diameter of the rupture disc stem.

In a second aspect, the first diameter of the rupture disc lip is larger than the radial cavity defined by the annular shoulder, which prevents the rupture disc lip from being inserted into the formed rupture disc cavity.

In a third aspect, one or more retainer segments are used for securing a wing nut to the upper head of the relief valve body.

In a fourth aspect, the annular shoulder is located within the rupture disc cavity and creates an annular stop for preventing the rupture disc lip from moving beyond a certain point into the rupture disc cavity.

In a fifth aspect, a marking on the outside of the relief valve body indicates a correct way to insert the rupture disc into the rupture disc cavity.

In a sixth aspect, the rupture disc includes a rupture portion made of at least one of a nickel- or nickel-chromium-based alloy, Inconel Alloy 600, ceramic, steel, or plastic.

In a seventh aspect, the rupture disc includes a rupture portion made of two or more materials.

In an eight aspect, a hex nut is used to secure the rupture disc in the rupture disc cavity.

In a ninth aspect, a washer is positioned between the hex nut and the rupture disc lip.

In a tenth aspect, the rupture disc has a rupture portion that curves toward the upper head of the relief valve body.

In an eleventh aspect, the rupture disc has a rupture portion that is dome shaped.

In a twelfth aspect, the rupture disc has a rupture portion that is barrel shaped.

In a thirteenth aspect, a shrapnel catcher is positioned to catch shrapnel from the rupture disc upon rupturing, and the shrapnel catcher is positioned at the base of the relief valve body where pressurized fluid flowing through the one or more internal cavities exits.

In a fourteenth aspect, the shrapnel catcher includes a plurality of holes that allow fluid to flow through the shrapnel catcher and out of the relief valve body.

A fifteen aspect is directed to a pressure relief valve assembly that includes a relief valve body having an upper head and a base. One or more internal cavities are formed coaxially along a center axis within the relief valve body, and the internal one or more cavities include at least a rupture disc cavity. The pressure relief valve assembly includes a rupture disc. The rupture disc includes: a rupture disc lip, a rupture disc stem that is radially narrower than the rupture disc lip, and a rupture portion that is curved in the direction of the rupture disc lip. A shoulder internal to the relief valve body allows the rupture disc stem to be inserted into a rupture disc cavity within the relief valve body and stops the rupture disc lip from being inserted into the rupture disc cavity.

In a sixteenth aspect, a marking is located on an outside of the relief valve body. The marking indicates a direction for inserting the rupture disc stem into the internal one or more cavities.

In a seventeenth aspect, the rupture disc includes a rupture portion made of at least one of a nickel- or nickel-chromium-based alloy, Inconel Alloy 600, ceramic, steel, or plastic.

An eighteenth aspect includes a wing nut secured to the upper head of the relief valve body; a hex nut secured within the internal one or more cavities defined by the relief valve body; a washer positioned between the rupture disc and the hex nut; and a rupture disc o-ring positioned below the rupture disc on an end opposite the rupture disc lip.

A nineteenth aspect includes a shrapnel catcher with a plurality of holes for allowing pressurized fluid to flow through the shrapnel catcher and catching shrapnel that comes off the rupture disc after rupturing.

A twentieth aspect is directed to a pressure relief valve assembly comprising a relief valve body having an upper head and a base, wherein one or more internal cavities are formed coaxially along a center axis within the relief valve body. The internal one or more cavities include at least a rupture disc cavity. The pressure relief valve assembly includes a rupture disc comprising that includes: a rupture disc stem that cylindrically extends around the center axis, a rupture disc that is radially larger than the rupture disc stem, and a rupture portion shaped as a dome that curves toward the rupture disc lip. A shoulder internal to the relief valve body allows the rupture disc stem to be inserted into a rupture disc cavity within the relief valve body and stops the rupture disc lip from being inserted into the rupture disc cavity. A shrapnel catcher with a plurality of holes for allows fluid to pass through while also catching shrapnel breaking off the rupture dome when ruptured.

Other aspects, features, and advantages will become apparent from the following detailed description when taken in conjunction with the accompanying drawings, which are a part of this disclosure and which illustrate, by way of example, principles of the disclosed embodiments.

BRIEF DESCRIPTION OF THE DRAWINGS

The accompanying drawings facilitate an understanding of the various embodiments.

DETAILED DESCRIPTION

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Embodiments discussed herein generally refer to a pressure relief valve assembly that includes a rupture disc designed to only fit within the pressure relief valve assembly—specifically within an internal rupture disc cavity of the pressure relief assembly. In some embodiments, the rupture disc includes an upper lip that radially extends around an upper portion of the rupture disc, and effectively eliminates installation errors for installing the rupture disc into the pressure relief valve assembly. The radial lip portion of the rupture discs disclosed herein are circumferentially too large to fit within a chamber in the pressure relief valve where the rupture discs are to be situated. Put another away, some embodiments include a conical chamber within the relief valve assembly that has a smaller radius than the radius of the extended upper lip of the rupture disc disclosed herein, thereby preventing a service person to accidentally install the rupture disc upside down in the chamber of the pressure relief assembly. Having generally—and non-exhaustively—described some of the embodiments disclosed herein, attention is now turned toward the accompanying drawings.

Figure 1:
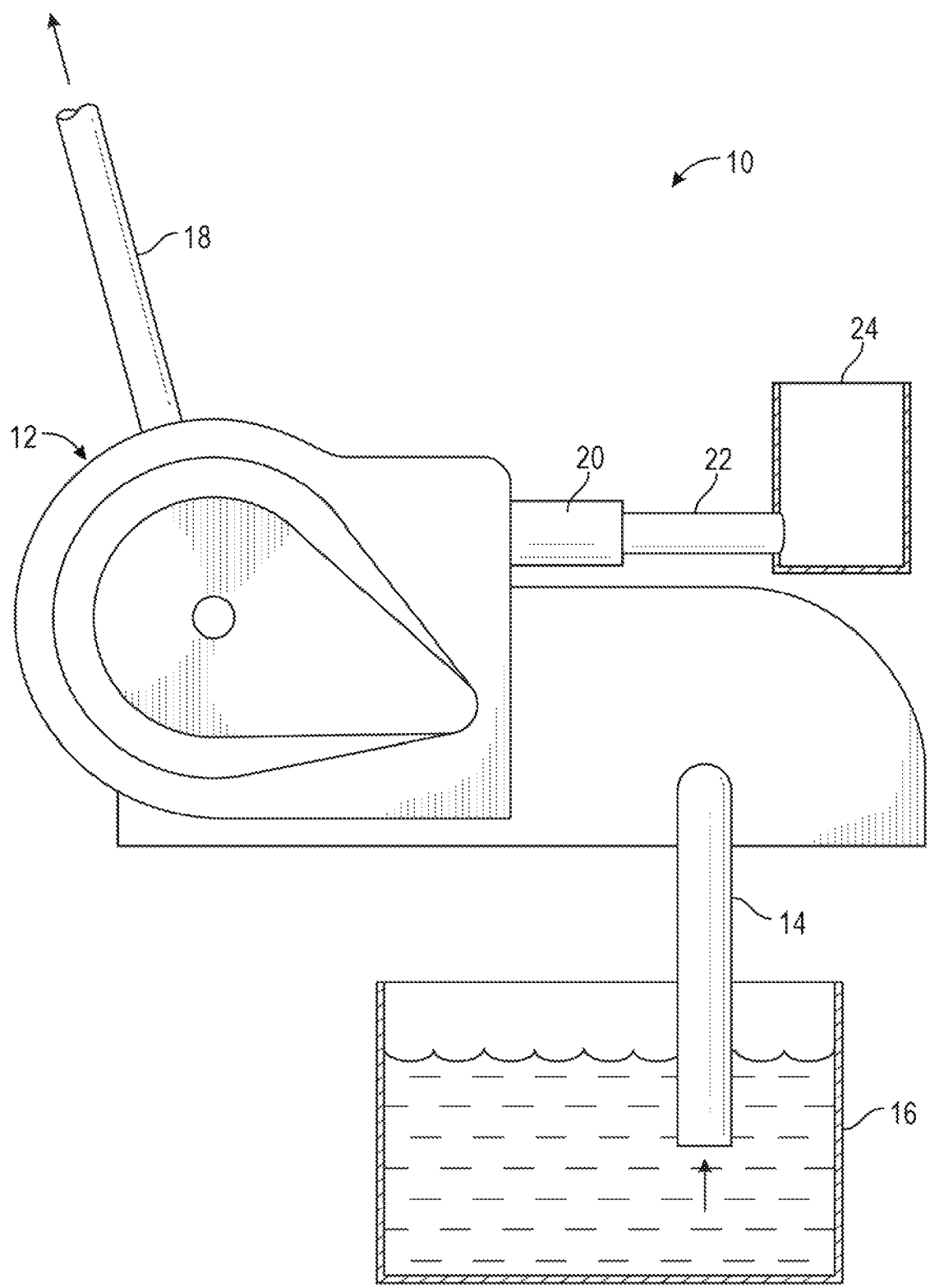
FIG. 1 is a diagrammatic illustration of a pumping system with a pressure relief valve assembly.

FIG. 1 is a diagrammatic illustration of a pumping system 10 with a pressure relief valve assembly 20. The pumping system 10 includes a pump assembly 12 that is in fluid communication with an intake pipe 14. A fluid reservoir, such as a holding tank 16, is in fluid communication with the intake pipe 14. A discharge pipe 18 is fluid communication with the pump assembly 12. The pressure relief valve assembly 200 is in fluid communication with the pump assembly 12. The pressure relief valve assembly 200 is connected to, and in fluid communication with, a vent pipe 22, which in turn is connected to, and in fluid communication with, a fluid reservoir, such as an open tank 24.

In operation, in several exemplary embodiments, the pump assembly 12 draws fluid from the holding tank 16 through the intake pipe 14 and discharges the fluid at a substantially higher pressure through the discharge pipe 18. During the operation of the pump assembly 12, the pressure relief valve assembly 200 prevents an overpressure condition within at least the pump assembly 12 and/or the discharge pipe 18. More specifically, when the pressure differential across the pressure relief valve assembly 200 reaches or exceeds a predetermined pressure differential, the pressure relief valve assembly 200 operates to reduce, or relieve, the pressure within the pump assembly 12 by permitting fluid to flow from the pump assembly 12, through the pressure relief valve assembly 200 and the vent pipe 22, and into the open tank 24. As a result, the pressure relief valve assembly 200 operates to prevent a further increase in pressure to prevent or otherwise substantially reduce the likelihood of damage to the pumping system 10 and/or any system(s) in fluid communication therewith.

In several exemplary embodiments, the pump assembly 12 is a high-pressure mud pump, a reciprocating pump, or a continuous duty-cycle pump used in energy exploration and/or production operations, such for oil and gas drilling. The fluid pumped through the pump assembly 12 may be drilling fluid, hydraulic fracturing fluids, drilling mud, or the like. The discharge pipe 18 is operable to deliver such fluid to a wellhead assembly for injection into a well that penetrates one or more subterranean formations. As discussed in more detail below, the pressure relief valve assembly 200 includes a rupture disc that is configured to break when the fluid is pressurized beyond pressure rating of the rupture disc. For example, the rupture disc may measure two- or three-inches in diameter and/or may be rated to rupture anywhere from 2,000-16,000 psi, such as, for example but without limitation, 2,500, 3,000, 3,500, 4,500, 5,500, 6,500, 7,000, 7,500, 8,000, 8,500, 9,000, 9,500, 10,000, 10,500, 11,000, 11,500, 12,000, 12,500, 13,000, 13,500, 14,000, 14,500, 15,000, 15,500, 16,000, and any other rating therebetween. In some specific examples, the rupture discs measure two- or three-inches in diameter and are configured to the following pressures flow rates (shown in gallons per minute (GPM) and barrels per minute (BPM)):

TABLE 1

EXAMPLE RUPTURE DISC RATINGS (VARIOUS PRESSURES)

| Pressure | 2-inch Rupture Discs | | 3-inch Rupture Discs | |
|---|---|---|---|---|
| (PSI) | GPM | BPM | GPM | BPM |
| 15,000 | 1,032 | 24.6 | 2,989 | 71.2 |
| 14,500 | 1,011 | 24.1 | 2,938 | 70 |
| 14,000 | 994 | 23.7 | 2,887 | 68.7 |
| 13,500 | 976 | 23.2 | 2,835 | 67.5 |
| 13,000 | 958 | 22.8 | 2,782 | 66.2 |
| 12,500 | 939 | 22.4 | 2,728 | 65 |
| 12,000 | 920 | 21.9 | 2,673 | 63.6 |
| 11,500 | 901 | 21.4 | 2,617 | 62.3 |
| 11,000 | 881 | 21 | 2,559 | 60.9 |
| 10,500 | 861 | 20.5 | 2,500 | 59.5 |
| 10,000 | 840 | 20 | 2,440 | 58.1 |
| 9,500 | 818 | 19.5 | 2,378 | 56.1 |
| 9,000 | 797 | 19 | 2,314 | 55.1 |
| 8,500 | 774 | 18.4 | 2,249 | 53.6 |
| 8,000 | 751 | 17.9 | 2,182 | 51.9 |
| 7,500 | 727 | 17.3 | 2,112 | 50.3 |
| 7,000 | 702 | 16.7 | 2,041 | 48.6 |
| 6,500 | 677 | 16.1 | 1,966 | 46.8 |
| 6,000 | 650 | 15.5 | 1,889 | 45 |
| 5,500 | 622 | 14.8 | 1,808 | 43.1 |
| 5,000 | 593 | 14.1 | 1,724 | 41 |
| 4,500 | 563 | 13.4 | 1,635 | 38.9 |
| 4,000 | 531 | 12.6 | 1,541 | 36.7 |
| 3,500 | 496 | 11.8 | 1,441 | 34.3 |
| 3,000 | 459 | 10.9 | 1,334 | 31.8 |
| 2,500 | 419 | 10 | 1,217 | 29 |

These rupture disc ratings are merely provided as examples, as other rupture discs with different ratings may be used in the disclose pressure relief valve assembles 20.

In several exemplary embodiments, instead of being a high-pressure mud pump used in energy exploration and/or production operations, the pump assembly 12 is used in one or more other types of pumping systems used in energy exploration and/or production operations, one or more other types of pumping systems used in operations other than energy exploration and/or production operations, one or more types of fluid systems, one or more types of industrial systems, etc. The combination of at least the pump assembly 12 and the pressure relief valve assembly 200 may include, or is part of, one or more pumping units. In several exemplary embodiments, the combination of at least the pump assembly 12 and the pressure relief valve assembly 200 is, includes, or is part of, a primary pumping line. In several exemplary embodiments, the combination of at least the pump assembly 12 and the pressure relief valve assembly 200 is, includes, or is part of, a main line. In several exemplary embodiments, the combination of at least the pump assembly 12 and the pressure relief valve assembly 200 is, includes, or is part of, a main line and the pressure relief valve assembly 200 provides secondary pressure relief.

As shown in FIG. 1, the pressure relief valve assembly 200 is in fluid communication with the pump assembly 12 by being connected directly to the pump assembly 12. Alternatively, in several exemplary embodiments, the pressure relief valve assembly 200 is in fluid communication with the pump assembly 12 by being connected directly to the discharge pipe 18. In several exemplary embodiments, one or both of the vent pipe 22 and the open tank 24 is/are omitted from the pumping system 10.

The pump assembly 12 is but one exemplary type of oil and gas pump that may use the various pressure relief assemblies 20 and rupture discs disclosed herein. These pressure relief assemblies 20 and rupture discs may be affixed to fluid channels of other types of oil and gas or mining pumps. For example, a centrifugal pump used for pumping mining slurries may use the pressure relief assemblies 20 or rupture discs disclosed herein. Thus, it should be noted that embodiments are not limited to using the disclosed pressure relief assemblies 20 and the rupture discs only on oil and gas pumps, as the various pressure relief assemblies 20 and rupture discs may be applied to any industrial equipment where enhanced pressure pumping of fluids or proppants is performed and needing to be monitored for safety concerns.

Figure 2:
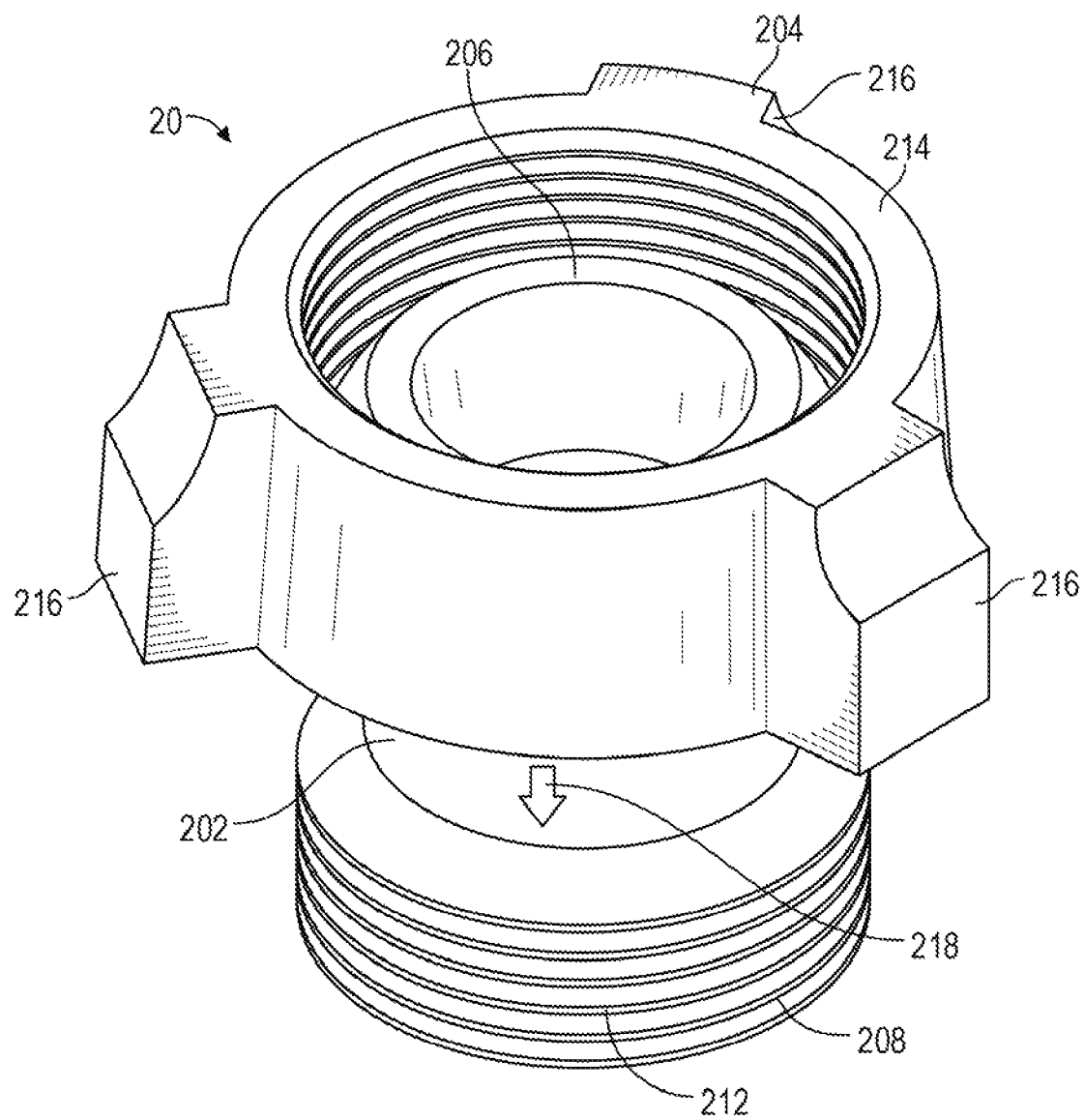
FIG. 2 is a perspective view of a pressure relief valve assembly for a rupture disc with a radially protruding lip, according to some embodiments.
Figure 3:
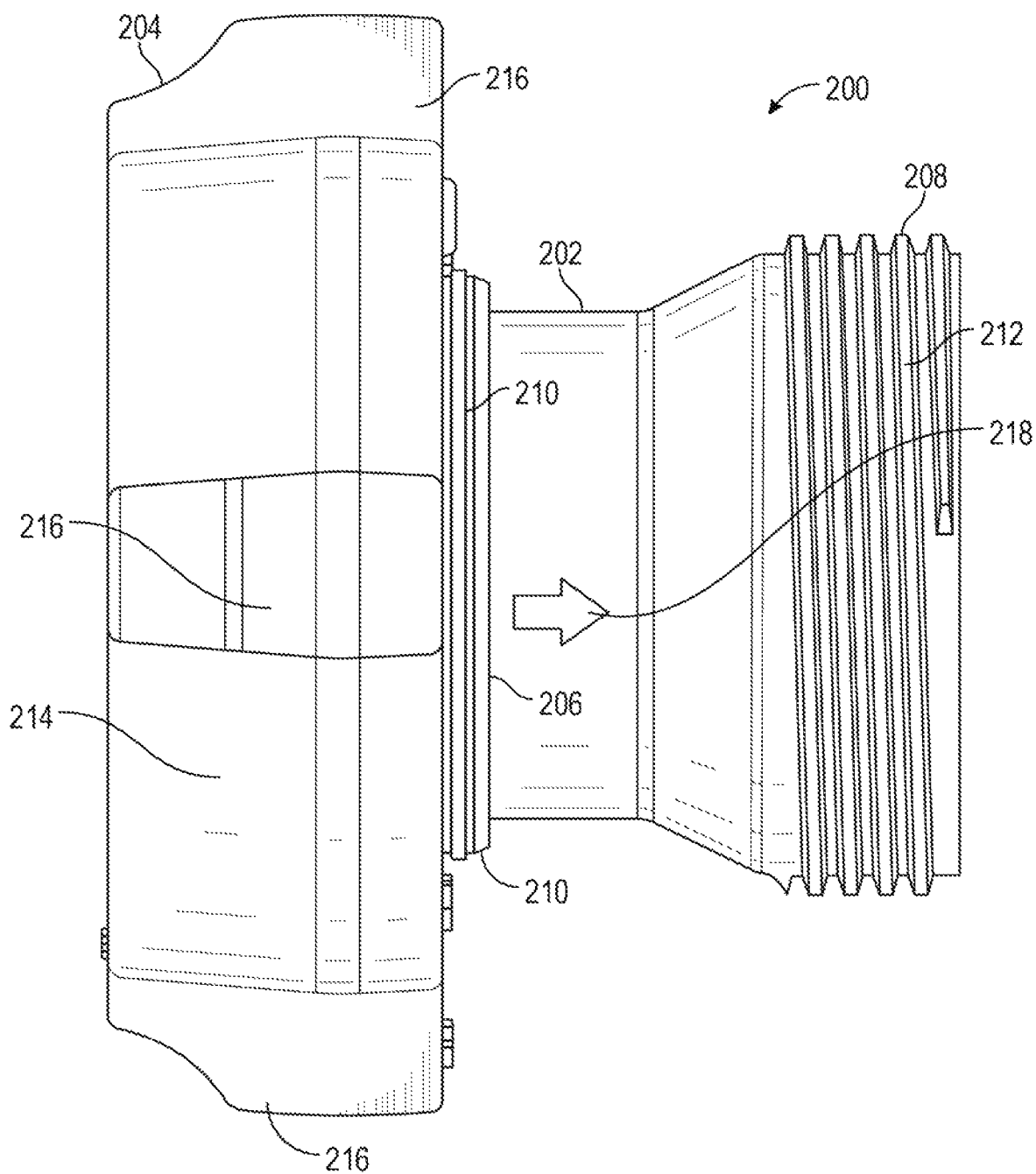
FIG. 3 is a side view of a pressure relief valve assembly for a rupture disc with a radially protruding lip, according to some embodiments.

FIGS. 2 and 3 are perspective and side views of a pressure relief valve assembly 200 for a rupture disc with a radially protruding lip, according to some embodiments. In some embodiments, the pressure relief valve assembly 200 includes a relief valve body 202 and a wing nut 204. Looking specifically of FIG. 2, the relief valve body 202 includes an upper head 206 and a lower base 208. In some embodiments, the wing nut 204 is threadably engaged with the relief valve body 202, fitting around the upper head 206. Alternatively, the wing nut 204 may be pressure fit to the upper head 206, snapped into place by way of pressure grooves, fastened, or otherwise connected to the upper head 206.

In some embodiments, the wing nut 204 includes an annular body 214 and a plurality of circumferentially spaced lugs 216 extending radially outward from the annular body 42. Alternative embodiments may include other shapes of wing nut 216, e.g., square, hexagonal, or the like. The lugs 216 provide a user or tool easy engagement for screwing the wing nut on and off the upper head 206. Though depicted as having three lugs 216, other embodiments have more or fewer than three lugs 216. Moreover, as shown in more detail in FIG. 3, the wing nut 204 is internally threaded to mate with reciprocal external threads 210 of the upper head 206. Threads 210 of the wing nut 204 threadably engage reciprocal exterior threads 210 of the upper head 206 on the relief valve body 202. One may rotate the wing nut 204 onto and off the relief valve body 202 using the lugs 216. Additionally, in some embodiments, the base 206 is equipped with external threads 212 for connection to other equipment or piping or to another connector (e.g., another wing nut).

In some embodiments, the pressure relief valve assembly 200 also includes an arrow 218, or other type of marking, that points toward the based 208 of the pressure relieve valve 202. As discussed in more detail below, some particular embodiments, the arrow 218 points away from the upper lip of the rupture disc when it is assembled correctly. Arrow 218 assists users replacing the rupture discs inside the pressure relief valve assembly 200 by pointing in the direction that the rupture disc is to be inserted, specifically in the direction that a narrower stem of the rupture disc (as described in more detail below) is to be inserted while an upper radially protruding lip of the rupture disc is positioned away from the direction the arrow 218 is pointing. For example, the arrow 218 may signal a user to position the upper radially protruding lip of the rupture disc toward the upper head 206 of the pressure relief valve 202, and the lower, narrower portion of the rupture disc is to be inserted facing the base 208 of the pressure relief valve 202.

The arrow 218 may be printed, etched, lasered, or otherwise marked anywhere on the pressure relief valve 20. Alternatively or additionally, the pressure relief valve assembly 200 may be marked with other markings or indicia directing users on how to insert replacement rupture discs. For example, text, images, pictures, diagrams of the rupture disc, or the like may be marked, etched, or otherwise marked on the side of pressure relieve valve 202 to instruct users on properly replacing a rupture disc. In other embodiments, the indicia include a scannable image or code (e.g., bar code, QR code, or the like) that directs a user's computing device (e.g. smart phone, laptop, mobile tablet, or the like) to an online resource with instructions about the rupture disc and/or its installation or historical use or service.

A rupture disc is typically only useful to withstand pressure at a particular rating if inserted in the correct way in a pressure relief valve. Inserting one upside down may case the relief valve body 202 to function improperly. Thus, the arrow 218—or other indicia—is particularly useful in helping users safely and correctly replace rupture discs within the pressure relief valve 202.

Figure 4:
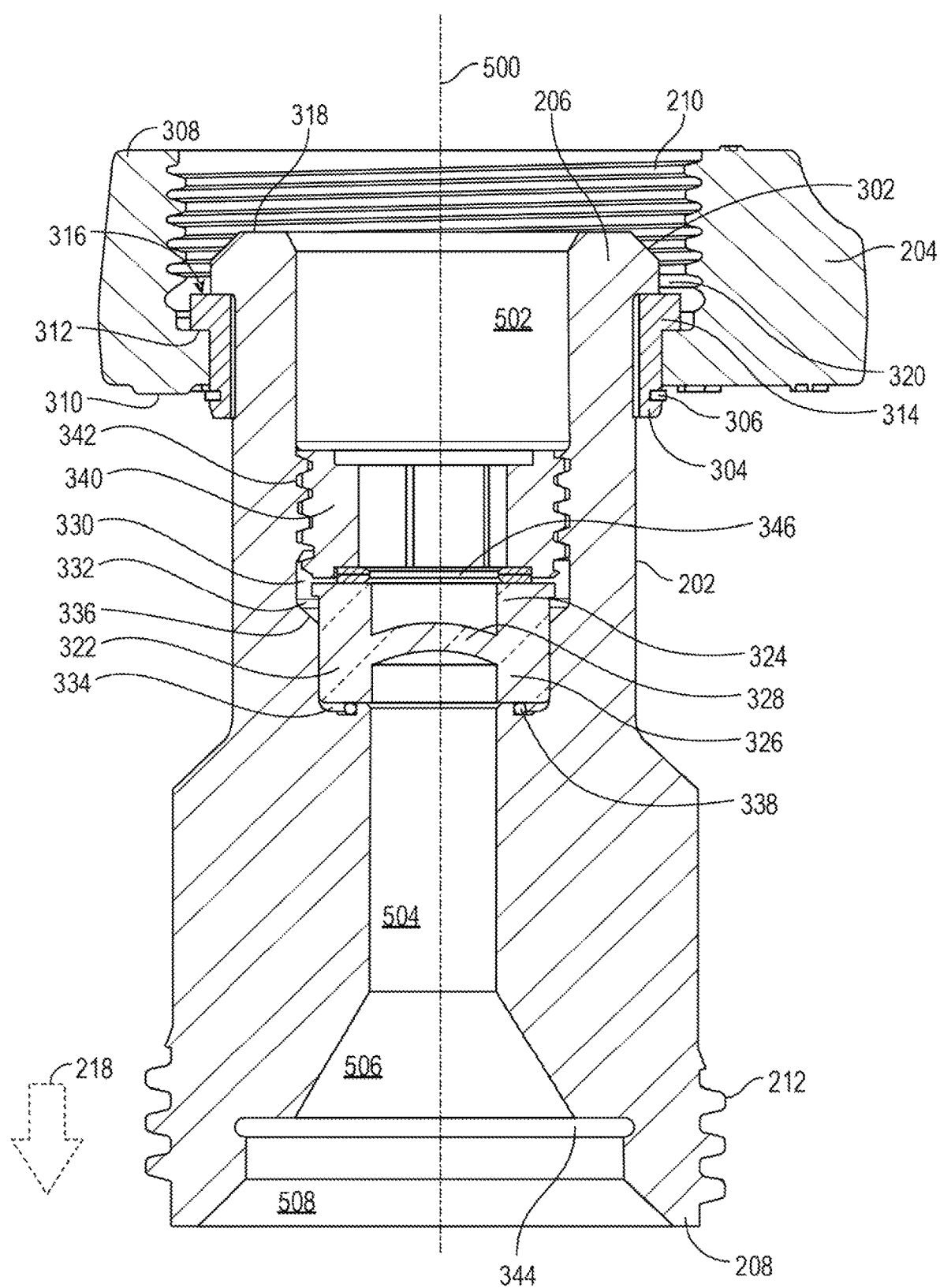
FIG. 4 is a cross-sectional view of a pressure relief valve assembly having a rupture disc with a radially protruding lip, according to some embodiments.

FIG. 4 is a cross-sectional view of the pressure relief valve assembly 200 having a rupture disc 322 with a radially protruding rupture disc lip 324, according to some embodiments. In some embodiments, the pressure relief assembly 200 includes a head 302, retainer segments 304, retainer ring 306, rupture disc 322 with a rupture disc lip 324 and rupture disc stem 326, hex nut 340, seal 344, and rupture disc ring 346. The rupture disc is positioned inside of the pressure relief assembly 200 and is rated to rupture at a particular pressure. For example, the rupture disc may be rated to rupture at any of the disclosed pressure ratings discussed herein (e.g., in Table 1 above).

In some embodiments, as illustrated in FIG. 4 and with continuing reference to FIGS. 1-3, the upper head 206 of the pressure relieve valve 202 includes a fusto-conical, circumferentially-enlarged head 302, and the retainer segment(s) 304 are positioned to fit against a lower edge of the fusto-conical head 302. The pressure relief valve assembly 200 further may include one or more circumferentially-extending retainer segments 304 disposed about the upper head 206 and retained in place using one or more retainer rings 306. The retainer segments 304 may include one or more axial grooves for receiving the retainer ring 306.

In some embodiments, the annular body of the wing nut 304 includes opposing end portions 308 and 310, and internal threads 210 formed in the interior of the annular body and adjacent, or at least proximate, the end portion 308. An internal annular shoulder 312 is defined in the interior of the annular body of the wing nut 304 at an axial position between the internal threads 210 and the end portion 310. The one or more retainer segments 304 may extend within the wing nut 204 and include respective external shoulders 314, which are axially spaced from the retainer ring 306 while engaging the internal annular shoulder 312 of the wing nut 204. In some embodiments, respective end faces 316 are defined by the one or more retainer segments 304, facing axially in a direction away from the retainer ring 306.

In some embodiments, an axially-facing end face 318 is also defined by upper head 206. The head 302 of the upper head 206 angles outward (radially) away from the end face 318, forming an external annular shoulder 320 is formed in the exterior of the upper head 206 at the end portion thereof opposing the base 208. As a result, the external annular shoulder 320 is axially positioned between the head 302 of the upper head 206 and the and the base 208.

In the depicted embodiment, the pressure relief valve assembly 200 defines a bore, or fluid channel, along a longitudinally-extending center axis 500. The bore is made up of upper cavity 502, internal straight cavity 504, internal angled cavity 506, and lower cavity 508. Cavities 502-508 (which operate as fluid and gas passages, in some embodiments) are coaxial and include varying diameters as shown. This is just one example of the internal bore through the relief valve body 202. Other bore and cavity shapes, sizes, and angles may be used.

Extending below the internal threads 342 of the relief valve body 202, the internal cavity 502 includes a rupture disc cavity 330 for receiving the rupture disc 320. In some embodiments, the relief valve body 202 is fusto-conically shaped to form the rupture disc cavity 330 to provide an area for receiving the rupture disc stem 326 and the rupture disc lip 324. The rupture disc cavity 330 is coaxial along the central axis 500 and includes a lower conical bore portion 334 to reciprocally receive the cylindrical stem 326 of the rupture disc 322 and an upper shoulder bore portion 336 that receives the lip 324 of the rupture disc 322. Additionally, in some embodiments, the rupture disc cavity 330 includes a fusto-conical shoulder portion 336 where the relief valve body 202 tapers (conically) toward the base 208. This shoulder portion 336 angles radially inward toward the center axis 500 to provide a stop for the rupture disc lip 324 of the rupture disc 322 to rest against. This angled shoulder portion 336 extends toward a lower cylindrical stem of the rupture disc cavity 322 for receiving a correspondingly shaped conical rupture disc stem 326 of the rupture disc 322.

Within the shoulder bore portion 336, the shoulder 332 functions as a stop for the rupture disc lip 324, ensuring that that entire rupture disc 322 cannot be inserted too far into the rupture disc cavity 330. The shoulder 332 is annular and fusto-conical in shape (in some embodiments) and extends into the rupture disc cavity 330, thereby defining a radial shoulder cavity through the center axis 500 that is smaller than the diameter of the rupture disc lip 324 but larger than the diameter of the rupture disc stem 326. In other words, the diameter of the shoulder 332 measures between the diameters of the rupture disc lip 324 and the rupture disc stem 326. Also, the shoulder 332 may be formed in any number of ways. For example, a washer or washer (e.g., steel, tungsten carbide, tungsten nickel, or the like) may be inserted within a corresponding groove (not shown) of the relief valve body, a weld may be made to form the shoulder, or the like. Alternatively or additionally, the rupture disc lip 324 may include a lower stop with an angled face that reciprocates the angle of declination in the shoulder portion 336.

In some embodiments, the rupture disc 322 is removably inserted down through upper cavity 502 into a rupture disc cavity 330. The upper cavity 502 includes an upper cylindrical portion without threading, a middle-threaded portion 342 with threading for receiving the hex nut 340, and the rupture disc cavity 330 between the middle-threaded portion 342 and the internal straight cavity 504. In some embodiments, the relief valve body 202 internally forms a radial shoulder 332 where the rupture disc cavity 330 narrows into the internal straight cavity 504, and that shoulder provides a stop for the rupture disc 322 to fit within the rupture disc cavity 330. On the other end of the rupture disc cavity 330, an angled upper end portion of the rupture disc cavity 330 is formed in the upper cavity 502

In some embodiments, the rupture disc 322 includes both the cylindrical rupture disc stem 326 and the rupture disc lip 324. In some embodiments, the rupture disc stem 326 is integrated with the rupture disc lip 324, meaning the two are not separable from each other. The rupture disc lip 324 extends radially outward from the rupture disc stem 326. Also, the rupture disc lip 324 has an outer diameter (measured radially from the center axis 500) that is larger than the radial axis (from the center axis 500) of the lower cylindrical portion of the rupture disc cavity 330. Put another way, the relief valve body 202 is formed to hold the rupture disc 322 in place—in only the correct the direction—by providing the lower cylindrical portion of the rupture disc cavity 330 for receiving the rupture disc stem 326 but not the rupture disc lip 324. Thus, a user cannot insert the rupture disc 322 incorrectly (i.e., upside down) because the rupture disc lip 324 does not fit within the lower cylindrical portion of the rupture disc cavity 330.

In some embodiments, the rupture disc stem 326 is considerably longer, length-wise, than the rupture disc lip 324 (e.g., 1.5, 2, 2.5, 3, 3.5 times as long) along the axis 500. Additionally or alternatively, the rupture disc stem 326 is radially narrower than the rupture disc lip 324. In some embodiments, the shoulder bore portion 336 is radially larger than the conical bore portion 334, and only the cylindrical stem 326 is sized to fit in the conical bore portion 334, and the shoulder 332 positions the rupture disc 322 perfectly within the rupture disc cavity 330. Moreover, the lip 324 is sized to be radially larger than the conical bore portion 334, thereby stopping service people from being able to insert the rupture disc 322 upside down. This configuration of relief valve body 202 stops someone from inserting the rupture disc 322 in upside down, thereby ensuring that rupture disc 322 is properly installed.

The rupture disc 322 includes a rupture portion 328 that breaks, or ruptures, when pressure ratings are exceeded. When inserted properly, bows upward toward the upper head 206. Put another way, when looking down into the fluid passage 61 from the upper head 204, the rupture portion 328 of the rupture disc 322 takes a concave shape. Alternative embodiments include a convex rupture portion 328. In some embodiment, the rupture portion 328 is dome shaped. In other embodiments, the rupture portion 328 is cone shaped. In other embodiments, the rupture portion 328 is fusto-cone shaped. In still other embodiments, the rupture portion 328 is cylinder or barrel shaped.

The disclosed rupture disc lip 324 and rupture disc stem 326 may be incorporated on other configurations of rupture disc. For instance, in some embodiments, the rupture disc 322 bends, or curves the other way, i.e., toward the base 208 of the relief valve body 202. In still other embodiments, the rupture disc 322 is a forward-acting type rupture disc.

In an exemplary embodiment, the rupture disc 322 is composed of one or more materials to provide corrosion protection for a variety of corrosive media, as well as excellent low temperature behavior. Examples of such materials include, without limitation, nickel- and nickel-chromium-based alloys (e.g., Inconel Alloy 600), ceramics, steel (e.g., stainless), plastics, and the like. The rupture disc 322 may be composed of one or more materials.

Rupture discs are traditionally made in a cylindrical shape, providing no evident indication (at least by way of shape) of the direction for being inserted into a pressure relieve assembly. Also, rupture discs are typically only pressure rated insofar as they are inserted correctly. So flipping the rupture disc upside down can not only damage the rupture disc itself (e.g., break too early), but also may be catastrophic for various industrial industries. For example, a pressure relief valve with a rupture disc that breaks at too low of a pressure may shut down drilling or well operations for some time, which can be incredibly costly. The rupture disc lip 324 ensures the rupture disc 322 is inserted correctly in the rupture disc cavity 330, because the enlarged radius of the rupture disc lip 324 cannot fit down into the lower cylindrical stem of the rupture disc cavity 330. Additionally, some embodiments that provide the arrow 218 (or other indicia) on the body of the pressure relief valve assembly 200 indicating the direction for inserting the rupture disc stem 326 include any extra layer of protection for ensuring the rupture disc 322 is inserted correctly.

In some embodiments, the lower portion (toward the base 208) of the rupture disc cavity 330 is angled to create an area for a rupture disc o-ring 338. In some embodiments, the bottom of the rupture disc stem 326—when inserted—abuts up against the beginning of the lower angled portion of the rupture disc cavity 330. The rupture disc o-ring 338 (which is optional) may be positioned within a lower fusto-conical cavity in the rupture disc cavity 330. The rupture disc o-ring 338 provides a seal for the rupture disc cavity 330. The rupture disc o-ring 338 may be manufactured out of metal (e.g., steel, iron, or the like), a wear-resistant material (e.g., tungsten carbide, tungsten nickel, or the like), plastic (e.g., polyurethane), rubber, or the like.

When installed correctly, in some embodiments, the rupture disc 322 has a rupture portion 328 that curves toward the direction of the upper head 206. In some embodiments, the rupture portion 328 is shaped as a dome, or half-sphere. In alternative embodiments, the rupture portion 328 is barrel-shaped. In still other embodiments, the rupture portion 328 is conically shaped. In still other embodiments, the rupture portion 328 is shaped as a pyramid. Alternative embodiments include a rupture disc 322 with a rupture portion that is similarly shaped but curved the opposite way, i.e., outward toward the base 208 of the relief valve body 202.

In some embodiments, a washer 346 is placed on top (toward the upper head 206) of the rupture disc 322, and the hex nut 340 is screwed onto the internal grooves 342 in the upper cavity 502. In some embodiments, the washer is a Nord-Lock® washer. Other embodiments use different types of washers. Moreover, the hex nut 340 includes eight internal hexagonal sides for fitting tools for installation. Other shaped nuts may be used to fit different types of installation tools. Once installed, the hex nut 340 and the washer 346 secure the rupture disc 322 in place within the rupture disc cavity 330. The hex nut 340 and the washer 346 are removable when the rupture disc 322 needs replacement.

In some examples, the upper cavity 502 has a diameter D1 spanning the upper head 206 of the pressure relief valve 202. In some examples, D1 is two inches. In other examples, diameter D1 is three inches. In still other embodiments, the diameter ranges between 2-3 inches, e.g., 2.1, 2.2, 2.3, 2.4, 2.5, 2.6, 2.7, 2.8, or 2.9 inches. Internal threads 342 of the relief valve body 202 include threaded protrusions into the cavity 502, and these internal threads 342 are used to receive reciprocal threads of the hex nut 340, which (again) is held in place atop the rupture disc 322 and the washer 346. The internal straight cavity 504 has a diameter D2 defined by a cylindrical portion of the base 208. In an example, as shown in FIG. 4, the diameter of the upper cavity 502 (D1 discussed above) is greater than the diameter D2 of the internal straight cavity 504. Additionally or alternatively, internal angled cavity 506 and 508 have defined fusto-conical cavities that are increase in in diameter as the cavities 506-508 span toward a lower end of the base 208 of the relief valve body 202. In this case, "lower end" of the relief valve body 202 refers to the end opposite the upper head 206.

In operation, high-pressure fluid or gas may be directed along the axis 500 of the pressure relief valve assembly 200, and the rupture disc 322 is used to relieve pressure, or otherwise alert users, when particular pressurization is exceeded. When pressure exceeds the rating of the rupture disc 322, the rupture disc ruptures to relieve excess pressure.

Such rupturing may generate an audible noise that can be heard by those servicing the well, or in some embodiments, the rupture disc 322 may be equipped with sensors send electrical signaling to computing devices—either over a wired or wireless connection and/or via a network—to alert appropriate personnel to over-pressurization of the fluids or gasses in the internal bore.

In operation, in several embodiments, with continuing reference to FIGS. 1, 2, 3, and 4, the pump assembly 12 (FIG. 1) draws fluid therein and discharges the fluid at a substantially higher pressure. During this operation of the pump assembly 12, the upper cavity 502 is in fluid communication with the pump assembly 12, and fluid pressure within the upper cavity 502 is exerted on the rupture disc 322 of the pressure relief valve assembly 200 in the direction of the arrow 218 (i.e., toward the base 208). When the fluid pressure within the upper cavity 502 remains below the pressure rating of the rupture disc 322 (or more specifically, the pressure capacity of the rupture portion 328), fluid stays within the upper cavity 502 and does not leak into cavities 504-508. But when the fluid pressure exceeds the rating of the rupture disc 322, the rupture portion 328 breaks and the liquid (or gas) in the upper cavity moved into the internal straight cavity 504, the internal angled cavity 506, the lower cavity 508, and then out from the relief valve body 202. As a result, the pressure relief valve assembly 200 operates to relieve the pressure within the pump assembly 12, preventing a further increase in pressure to prevent or otherwise substantially reduce the likelihood of damage to the pump assembly 12, one or more other components of the pumping system 10, and/or any system(s) in fluid communication therewith.

Figure 5:
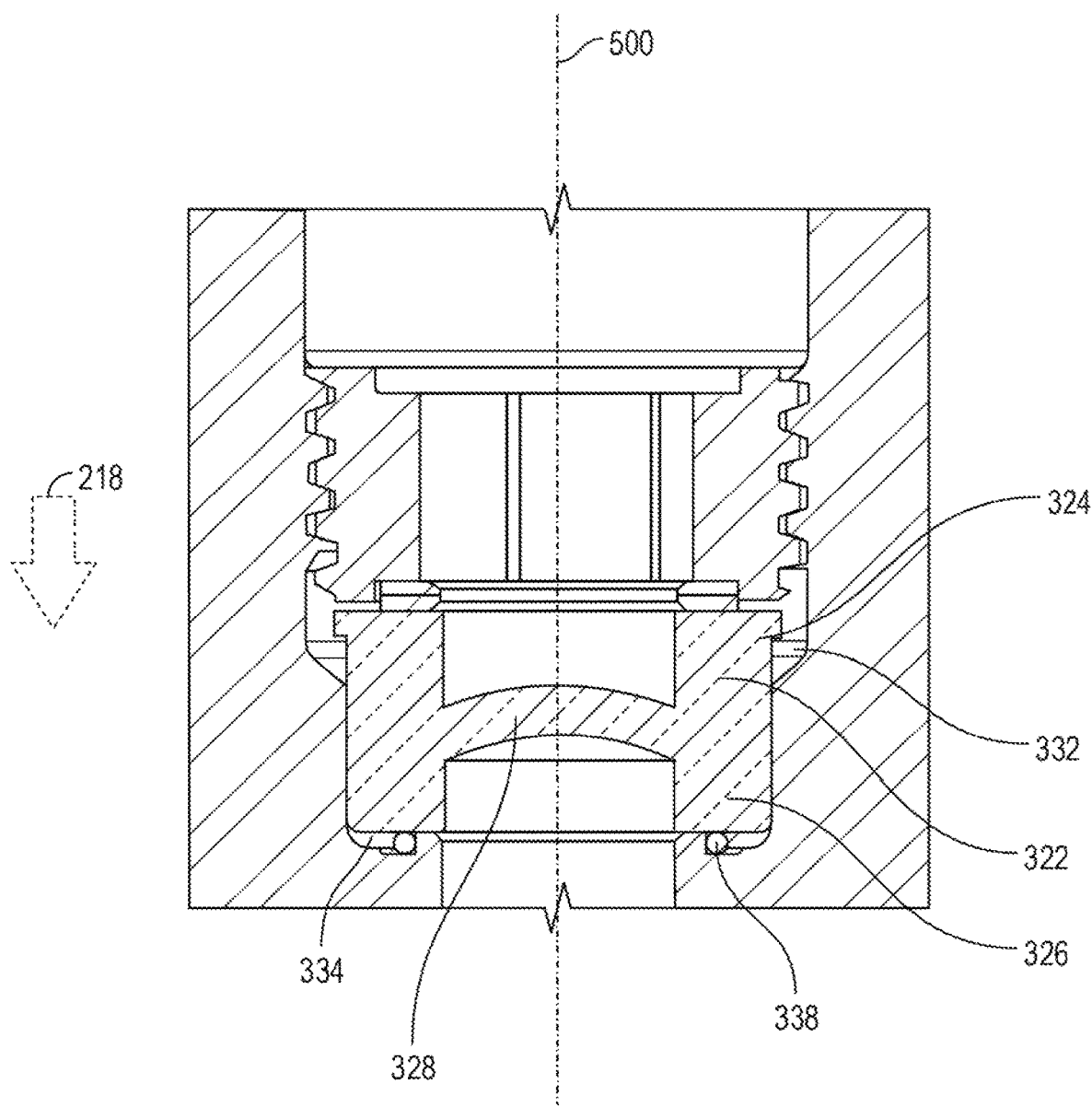
FIG. 5 is an expanded cross-sectional view of a pressure relief valve assembly having a rupture disc with a radially protruding lip, according to some embodiments.

FIG. 5 illustrates an expanded cross-sectional view of the rupture disc 322 with the radially protruding rupture disc lip 324, according to some embodiments. The rupture disc 322 fits within the rupture disc cavity 330 such at the rupture disc lip 324 fits up against the shoulder 332. Shoulder 332 is radially narrower than the rupture disc lip 324 and consequently prevents the rupture disc lip 324 from being mistakenly inserted down into the lower conical portion of the rupture disc cavity 330, where the rupture disc stem 326 is meant to be inserted. Furthermore, as shown in FIG. 5, the rupture disc o-ring 338 is positioned underneath the rupture disc stem 326 within the conical bore portion 334, facing toward the based 208 and away from the rupture disc lip 324.

Figure 6:
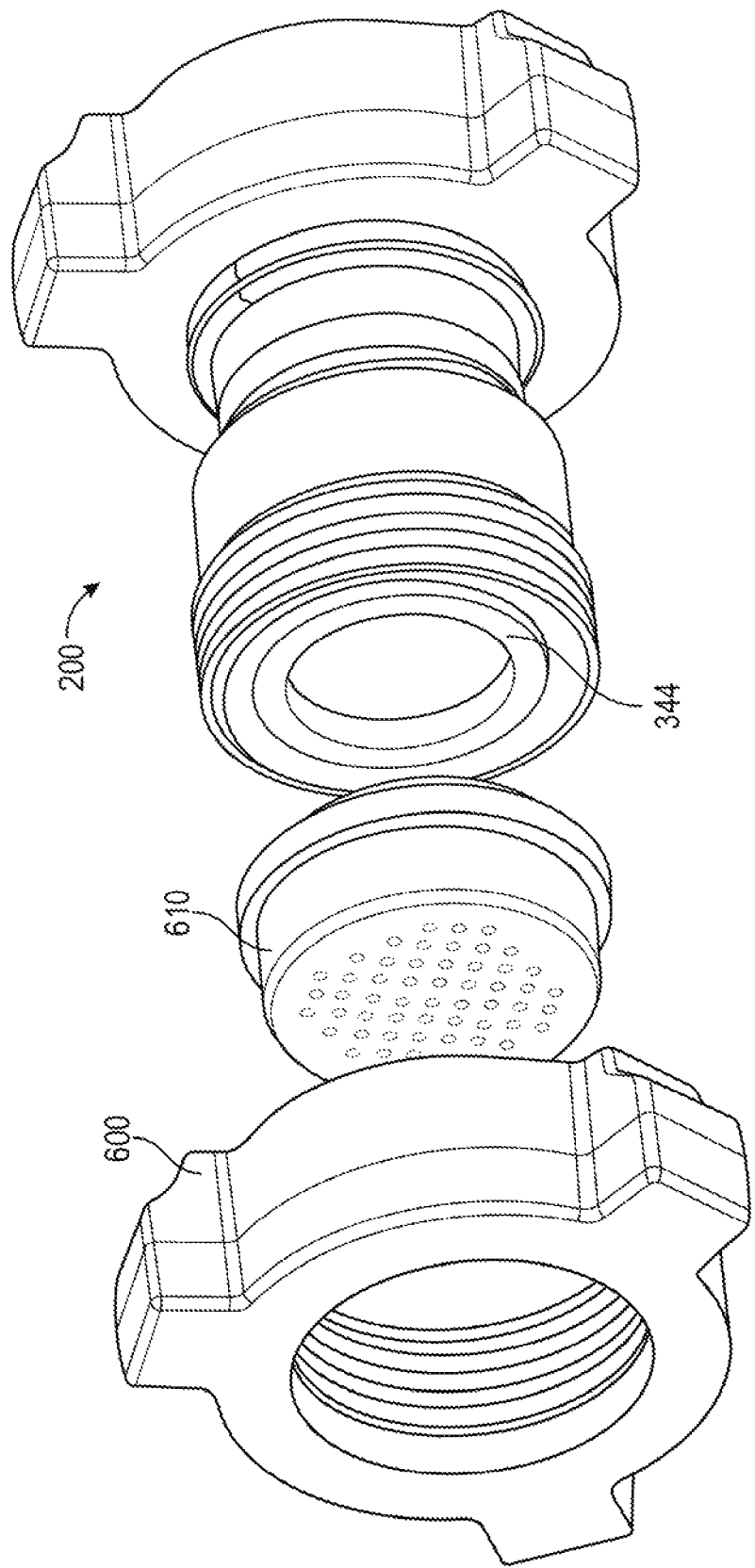
FIG. 6 is an exploded perspective view of a pressure relief valve assembly with a disc catcher for catching rupture disc fragments, according to some embodiments.

When the rupture disc 322 breaks, shrapnel from the ruptured rupture disc 322 may break off and flow through the cavities 504-508 with the pressurized liquid. To collect this shrapnel of the rupture disc 322, some embodiments include a shrapnel catcher at or near the base 208. This is shown in more detail in FIG. 6, which illustrates an exploded perspective view of the pressure relief valve assembly 200 equipped with a shrapnel catcher 610 that is locked into place on the base 208 with wing nut 600. In this particular embodiment, the shrapnel catcher includes one end that fits within the inner diameter of the seal 344.

In some embodiments, the shrapnel catcher is positioned at the base of the relief valve body where pressurized fluid flowing through the cavities 504-508, exiting the relief valve body 202 at through the base 208. In operation, when the rupture disc 322 breaks, the shrapnel catcher catches any shrapnel or debris of the rupture disc 322 that is carried through cavities 504-508. The shrapnel catcher also includes holes that allow fluid to flow through the shrapnel catcher 610 and out toward other components. These holes provide a pathway for pressurized fluid while at the same time catching broken fragments of the rupture disc 322. The shrapnel catcher 610 is an optional feature. Some embodiments include the shrapnel catcher 610, and other embodiments do not.

Figure 7:
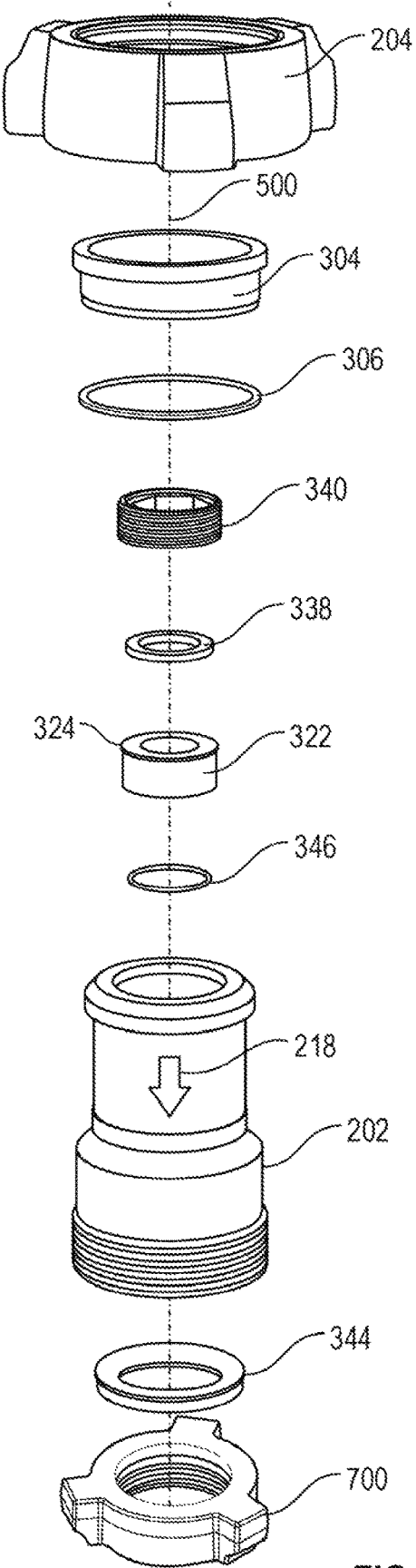
FIG. 7 is an exploded perspective view of a pressure relief valve assembly, according to some embodiments.

FIG. 7 is an exploded perspective view of a pressure relief valve assembly with a disc catcher for catching rupture disc fragments, according to some embodiments. As shown, the relief valve body 202 is marked with arrow 218 pointing away from the upper head 206 and toward the base 208. The washer 346, the rupture disc 322, the rupture disc o-ring 338, and the hex nut 340 are inserted into (e.g., within the upper cavity 502) the relief valve body 202 through an opening created the upper head 206. In some embodiments, the rupture disc 322 is placed with its rupture disc stem 326 facing in the direction of the base 208 and its rupture disc lip 324 facing the direction of the upper head 206. Additionally, in some embodiments, the washer 346 is placed under the rupture disc 322, with the rupture disc o-ring 338 atop the rupture disc 322 (above the rupture disc lip 324) and the hex nut 340 screwed into internal threads 342 (shown in FIGS. 4 and 5) to lock the rupture disc 322 in place. The upper head 208, the retainer ring 306 and the retainer component(s) 304 are positioned outside the relief valve body 202 around the upper head 206. The seal 344 and (optionally, though not shown) the shrapnel catcher 610 are inserted into the base 208 of the relief body 202. And, in some embodiments, a second wing nut 700 is positioned at the base 200 to both lock the seal and (optionally) shrapnel catcher 610 in place and to serve as a connected to other equipment with reciprocal threading to the internal threading of the second wing nut 700.

Figure 8:
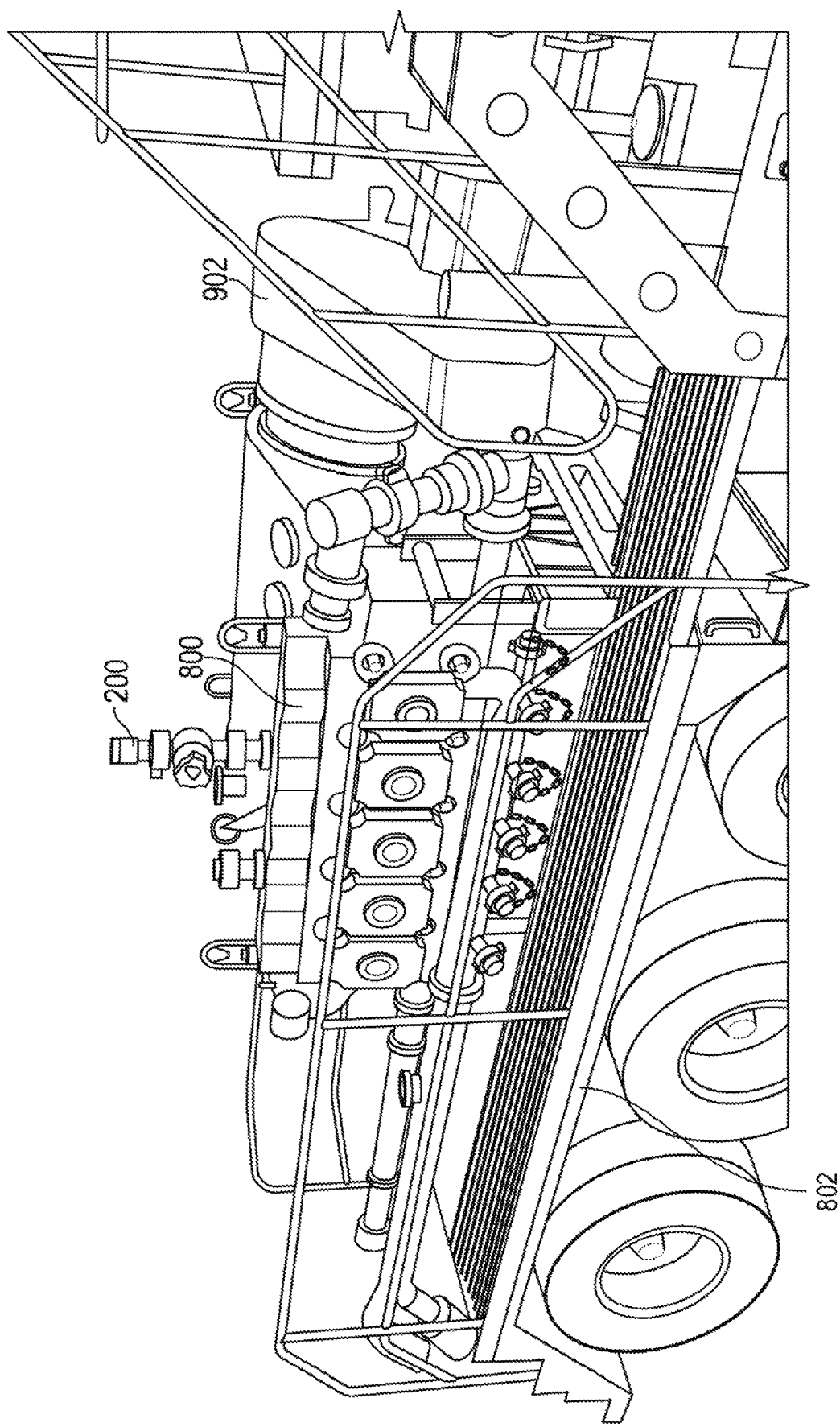
FIG. 8 is a perspective view of a pressure relief valve assembly affixed to a hydraulic fracturing pump, according to some embodiments.

FIG. 8 is a perspective view of a pressure relief valve assembly 200 affixed to a hydraulic fracturing pump ("frac pump") 800, according to some embodiments. The frac pump 800 is positioned on a trailer 802 that can be wheeled into position. The pressure relief valve assembly 200, which includes the components discussed above (including the rupture disc 322 having the radially protruding rupture disc lip 324), is attached at the upper head 206 to a fluid end of the frac pump 802. In operation, fluid moving through the fluid end into the pressure relief valve assembly 200 that is pressurized above the pressure rating of the internal rupture disc 322 causes rupturing of the rupture disc 322. Such rupturing may alert personnel to the fact that the pressure in the frac pump 800 is too high.

In some embodiments, sensors in the rupture disc 322 or within the pressure relief valve assembly 200 and used to detect and notify a user (e.g., on a computing device, mobile tablet, smartphone, or the like) or a web service (e.g., in a cloud-computing configuration) of the rupture disc 322 rupturing due to high pressure. Examples of such sensors include, without limitation, a pressure sensor, a temperature sensor, a light sensor, a microphone, an inertial measurement unit (IMU), or the like.

Figure 9:
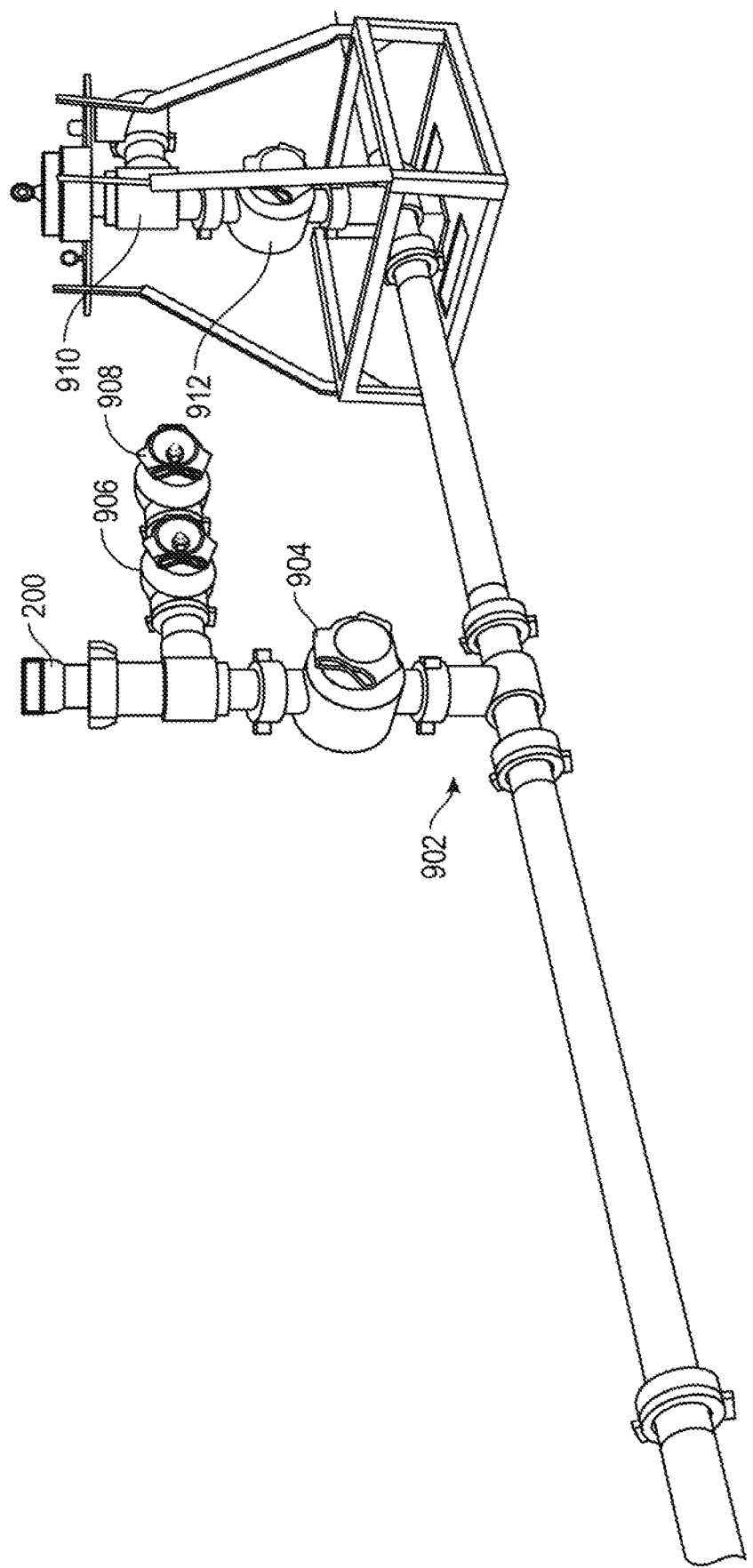
FIG. 9 is a perspective view of a pressure relief valve assembly affixed to flow iron for fracturing fluid used in hydraulic fracturing, according to some embodiments.

FIG. 9 is a perspective view of a pressure relief valve assembly 200 affixed to flow iron for hydraulic fracturing fluid ("frac fluid") used in hydraulic fracturing, according to some embodiments. Piping for frac fluid is carried through the illustrated piping. Pressure relief stacks 902 and 908 provide alternative flow paths for the frac fluid where the pressure relief assembly 200 may be situated. Though shown only on pressure relief stack 902, the pressure relief assembly 200 may be alternatively or additionally placed on the pressure relief stack 908. Looking at pressure relief stack 902, various valves 904-912 are positioned between the flow iron piping and the pressure relief valve assembly 200.

These valves 904-912 provide various mechanisms for directing fluid flow. Similar valves are found in the other pressure relief stack.

In operation, fluid moving through the flow iron into the pressure relief valve assembly 200 that is pressurized above the pressure rating of the internal rupture disc 322 causes rupturing of the rupture disc 322. Such rupturing may alert personnel to the fact that the pressure in the flow iron is too high. The depicted flow iron may be used for pumping frac fluid to a well head or carrying flowback fluid from a well head.

Figure 10:
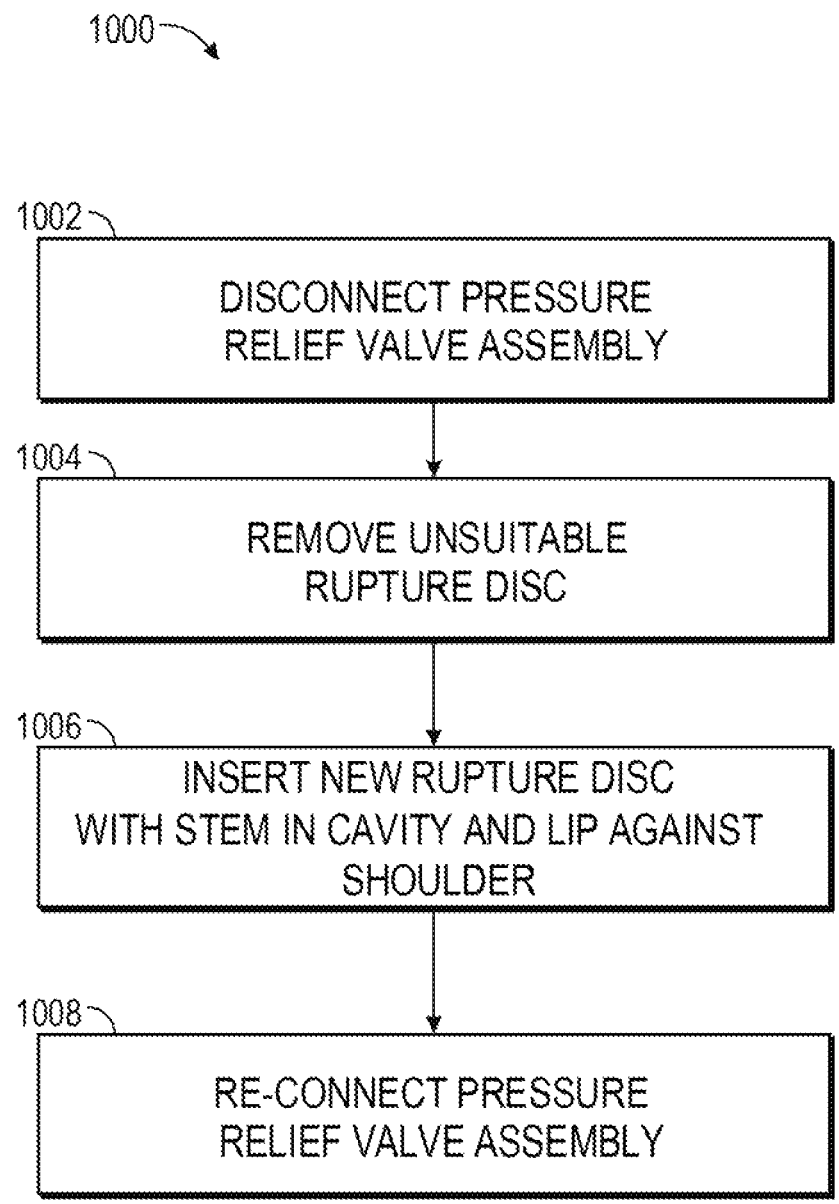
FIG. 10 is a flow chart illustrating a work flow for replacing a pressure relief valve assembly having a rupture disc with a radially protruding lip, according to some embodiments.

FIG. 10 is a flow chart illustrating a work flow 1000 for replacing a pressure relief valve assembly having a rupture disc with a radially protruding lip, according to some embodiments. The work flow 1000 is executed when the rupture disc 322 is deemed unsuitable. In one embodiments, the rupture disc 322 is deemed unsuitable after it has ruptured in accordance with the foregoing operation of the pressure relief valve assembly 20. In another embodiment, the rupture disc 322 is deemed unsuitable after it has been in the field for a predetermined service life.

The work flow 1000 includes a step 1002, at which the pressure relief valve assembly 200 is disconnected from operational equipment (e.g., frac pump, flow iron, etc.). At step 1004, the unsuitable rupture disc 322 is removed from rupture disc cavity 330. At step 1006 a new replacement rupture disc 322 is inserted into the rupture disc cavity 330 with the rupture disc stem 326 inserted into the rupture disc cavity so that the rupture disc lip 324 abuts the shoulder 332. Trying to insert the disclosed rupture disc 322 upside down will not work because the rupture disc lip 324 cannot fit within the rupture disc cavity 330 due to the radially narrower shoulder 332. After the new rupture disc 322 has been properly inserted, the pressure relief valve assembly 200 may be reconnected to the equipment where it is needed, as shown at step 1008.

In several exemplary embodiments, as established by the execution of the work flow 1000, the pressure relief valve assembly 200 provides a re-kittable housing. More particularly, after the rupture disc 322 ruptures or expires in operation, the pressure relief valve assembly 200 can be re-used by retrofitting the pressure relief valve assembly 200, that is, by replacing the unsuitable rupture disc 322 with a replacement rupture disc identical thereto. Therefore, the total cost of ownership is reduced because an operator only must replace the unsuitable rupture disc 322 and does not have to replace the entire pressure relief valve assembly 200, which assembly costs more than a replacement rupture disc that is identical to the rupture disc 322. Also, the rupture disc 322 is shaped to only be inserted correctly into the rupture disc cavity 330, thereby eliminating faulting installation. Thus, the pressure relief valve assembly 200 lowers cost and increases safety associated with pressure relief efforts.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right," "front" and "rear," "above" and "below," "upper" and "lower," and the like are used as words of convenience to provide reference points and are not to be construed as limiting terms.

In this specification, the word "comprising" is to be understood in its "open" sense, that is, in the sense of "including," and thus not limited to its "closed" sense, that is the sense of "consisting only of" A corresponding meaning is to be attributed to the corresponding words "comprise," "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A pressure relief valve assembly comprising a relief valve body having an upper head and a base and defining one or more internal cavities coaxially along a center axis within the relief valve body, the internal one or more cavities comprising at least a rupture disc cavity, and the relief valve body further including an annular shoulder that radially protrudes inward toward the center axis within the rupture disc cavity, the pressure relief valve assembly comprising:
   a rupture disc comprising:
   a rupture disc stem with a first diameter,
   a rupture disc lip with a second diameter that is larger than the first diameter of the rupture disc stem,
   a rupture portion that is formed to curve only toward the rupture disc lip regardless of direction of fluid flow through the one or more internal cavities of the relief valve body, wherein the rupture disc cavity is formed with a third diameter that is smaller than the second diameter of rupture disc lip and larger than the first diameter of the rupture disc stem.

2. The pressure relief valve assembly of claim 1, wherein the first diameter of the rupture disc lip is larger than the radial cavity defined by the annular shoulder prevents the rupture disc lip from being inserted into the formed rupture disc cavity.

3. The pressure relief valve assembly of claim 1, further comprising one or more retainer segments for securing a wing nut to the upper head of the relief valve body.

4. The pressure relief valve assembly of claim 1, wherein the annular shoulder is located within the rupture disc cavity and creates an annular stop for preventing the rupture disc lip from moving beyond a certain point into the rupture disc cavity.

5. The pressure relief valve assembly of claim 1, further comprising a marking on the outside of the relief valve body indicating a correct way to insert the rupture disc into the rupture disc cavity.

6. The pressure relief valve assembly of claim 1, wherein the rupture disc includes a rupture portion made of at least one of a nickel- or nickel-chromium-based alloy, Inconel Alloy 600, ceramic, steel, or plastic.

7. The pressure relief valve assembly of claim 1, wherein the rupture disc includes a rupture portion made of two or more materials.

8. The pressure relief valve assembly of claim 1, further comprising a hex nut used to secure the rupture disc in the rupture disc cavity.

9. The pressure relief valve assembly of claim 8, further comprising a washer between the hex nut and the rupture disc lip.

10. The pressure relief valve assembly of claim 1, wherein the rupture disc has a rupture portion that curves toward the upper head of the relief valve body.

11. The pressure relief valve assembly of claim 1, wherein the rupture disc has a rupture portion that is dome shaped.

12. The pressure relief valve assembly of claim 1, wherein the rupture disc has a rupture portion that is barrel shaped.

13. The pressure relief valve assembly of claim 1, further comprising a shrapnel catcher positioned to catch shrapnel from the rupture disc upon rupturing, wherein the shrapnel catcher is positioned at the base of the relief valve body where pressurized fluid flowing through the one or more internal cavities exits.

14. The pressure relief valve assembly of claim 1, wherein the shrapnel catcher includes a plurality of holes that allow fluid to flow through the shrapnel catcher and out of the relief valve body.

15. A pressure relief valve assembly comprising a relief valve body having an upper head and a base and defining one or more internal cavities coaxially along a center axis within the relief valve body, the internal one or more cavities comprising at least a rupture disc cavity, the pressure relief valve assembly comprising:
a rupture disc comprising:
a rupture disc lip,
a rupture disc stem that is radially narrower than the rupture disc lip, and
a rupture portion that is formed to curve only toward the rupture disc lip regardless of direction of fluid flow through the one or more internal cavities of the relief valve body; and
a shoulder internal to the relief valve body that allows the rupture disc stem to be inserted into a rupture disc cavity within the relief valve body and stops the rupture disc lip from being inserted into the rupture disc cavity.

16. The pressure relief valve assembly of claim 15, further comprising a marking on an outside of the relief valve body, the marking indicating a direction for inserting the rupture disc stem into the internal one or more cavities.

17. The pressure relief valve assembly of claim 15, wherein the rupture disc includes a rupture portion made of at least one of a nickel- or nickel-chromium-based alloy, Inconel Alloy 600, ceramic, steel, or plastic.

18. The pressure relief valve assembly of claim 15, further comprising:
a wing nut secured to the upper head of the relief valve body;
a hex nut secured within the internal one or more cavities defined by the relief valve body;
a washer positioned between the rupture disc and the hex nut; and
a rupture disc o-ring positioned below the rupture disc on an end opposite the rupture disc lip.

19. The pressure relief valve assembly of claim 15, further comprising a shrapnel catcher with a plurality of holes for allowing pressurized fluid to flow through the shrapnel catcher and catching shrapnel that comes off the rupture disc after rupturing.

20. A pressure relief valve assembly comprising a relief valve body having an upper head and a base and defining one or more internal cavities coaxially along a center axis within the relief valve body, the internal one or more cavities comprising at least a rupture disc cavity, the pressure relief valve assembly comprising:
a rupture disc comprising:
a rupture disc stem that cylindrically extends around the center axis,
a rupture disc that is radially larger than the rupture disc stem, and
a rupture portion shaped as a dome and formed to curve only toward the rupture disc lip regardless of direction of fluid flow through the one or more internal cavities of the relief valve body; and
a shoulder internal to the relief valve body that allows the rupture disc stem to be inserted into a rupture disc cavity within the relief valve body and stops the rupture disc lip from being inserted into the rupture disc cavity.

* * * * *